United States Patent Office 3,577,526
Patented May 4, 1971

3,577,526
STABILIZED SMALLPOX VACCINE
Louis R. Valette, Marcy L'Etoile, Rhone, France, assignor to Societe Anonyme dite: Institut Merieux, Lyon, Rhone, France
No Drawing. Filed June 13, 1969, Ser. No. 833,170
Int. Cl. A61k 27/10; C12k 5/00
U.S. Cl. 424—89                                    5 Claims

ABSTRACT OF THE DISCLOSURE

Smallpox vaccine is stabilized by dispersing the same in an aqueous solution containing sucrose. The solution can also contain dextran.

---

The present invention relates to a new smallpox vaccine for human use.

It is known that smallpox vaccine is now prepared from a vaccinal pulp taken from animals such as cows, sheep or bubalines.

It is also possible to prepare it by making a culture of the virus on chorioallantoid membrane of fertilized egg or on cell cultures.

When sufficient amounts of the virus have been obtained, the vaccinogenic tissue is ground, i.e., the cutaneous strips of the vacciniferous animal, of the membrane of the egg or cell cultures, then this ground material is decontaminated with chemical products such as phenic acid, formaldehyde or sodium merthiolate.

The vaccine thus obtained can be preserved by bringing it to the dry state, preferably by freeze drying.

However, it is generally preferred to commercialize it in the viscous liquid state, especially when the number of doses per unit of conditioning is small.

In this case, stabilizing the vaccine by putting it in suspension in glycerin water containing, for example, between 30 and 60% glycerol, is known.

The germicidal and bactericidal action of the glycerol and the syrupy character it confers on the vaccine constitute advantages which unfortunately are counterbalanced by a considerable virulicidal action.

As a result, smallpox vaccine stabilized by glycerol rapidly lose their vaccinating properties to such a point that the World Health Office recommends that "glycerin liquid vaccine be thrown out after 7 days storage between 0 and 10° C. or after 24 hours at higher temperatures."

Actually, it is well known that the shelf life is shorter the higher temperature at which it is kept and the greater the glycerol concentration.

The present invention has for its object a new smallpox vaccine characterized by the fact that it is made up of a ground virus material of the vaccine dispersed in an aqueous solution containing sucrose.

Use of sucrose gives, according to the invention, satisfactory results when it is used in a relatively slight concentration, for example, from 20 to 40%.

According to a preferred embodiment of the invention, there is used to disperse the vaccine virus, an aqueous solution of sucrose and dextran, the dextran making it possible to bring the viscosity of the sucrose solution to a sufficient value and to obtain a vaccine with the same appearance as previously known vaccines.

The titer of the vaccine according to the invention remains the same as that of present vaccines. For example, it can be at least $10^8$-vaccinal units per milliliter, and this meets international standards.

For a better understanding of the invention, some ways of practicing of the invention will now be described as well as tests that were made and which will make it possible to establish the superiority of the vaccine according to the invention over previously known vaccines.

In all the embodiments that will be described, the same lot of pulp G 31, kept at −20° C., was used to start with.

This pulp is ground in phenic water at a rate of 1 g. of pulp per 10 ml. of phenic water at 1%.

After grinding, the solution is left standing for 24 hours at ambient temperature.

It is then fractionated in equal volumes each corresponding to 2 g. of vaccinal pulp.

Each volume is subjected to a centrifuging for 20 minutes at +4° C. with an acceleration of 37,000 g.

Each centrifuging residue is taken up with 10 ml. of holoside for testing or a reference solution containing glycerol.

In the following tables the various solutions of holosides are saturated solutions except in the case where the proportions of holosides are indicated.

Finally, a last grinding is performed for homogenizing.

The various vaccines prepared as indicated above were stored for several months in darkness at ambient temperature, the recording of the temperature during the test period gave average values between 20 and 25° C., however, with points of short duration of +10° C. and +33° C.

These storage conditions correspond to normal conditions of use.

During the storage test period, each of the vaccines was titrated every two weeks. This titrating was performed on chorio-allantoic membranes of chick embryos 12 days old according to the technique of J. C. N. Westwood, P. H. Phipps and E. A. Boulter (the titration of vaccinia virus on the chorio-allantoic membrane of the developing chick embryo; J. Hyg. (London), 1957, 55, pp. 123–129).

An inoculation of 0.1 ml. per egg and three logarithmic dilutings for each vaccine at a rate of 10 eggs per diluting were made.

Counting of the pustules was performed after two days of incubation at +36° C.

The titers measured at different stages of storage yielded the following results:

Titers measured after three months of storage

20% sucrose _____ 7.82
Dextran _____ 7.73
Glycerol 60% (sample) _____ 6.5

Periods necessary to observe a loss of virulence equal to 1 logarithm

Weeks
20% sucrose _____ 12
50% glycerol (sample) _____ 3

Then another series of storage tests were made on 5 vaccines presenting the following characteristics:

| No. | Suspension medium | pH | Viscosity, cp. |
|---|---|---|---|
| 1 | 40% sucrose | 7.1 | 4.37 |
| 2 | 30% sucrose–5% dextran | 7.11 | 7.83 |
| 3 | 20% sucrose–5% dextran | 7.19 | 5.4 |
| 4 | 50% glycerol | 7.47 | 4.6 |

These tests made it possible to show the following evolution of the titers, the storage being at a temperature of 24° C.

| Suspension medium | Titers | | | | | |
|---|---|---|---|---|---|---|
| | Initial | After 1 week | After 2 weeks | After 3 weeks | After 4 weeks | After 6 weeks |
| 40% sucrose | 7.93 | 7.84 | 7.11 | 7.17 | 6.80 | 6.46 |
| 30% sucrose–5% dextran | 7.50 | 7.32 | 7.02 | 6.96 | 6.64 | 6.08 |
| 20% sucrose–5% dextran | 7.20 | 7.15 | 6.79 | 6.57 | 6.56 | 5.98 |
| 50% glycerol | 7.40 | 6.86 | 6.75 | 6.44 | 5.60 | 3 |

These tests show that the vaccines according to the invention present after six weeks a virulence which is pretty much at least twice that of standard vaccines put in a 50% glycerol solution.

Therefore, it can be seen that the vaccines according to the invention offer the advantage of being much better able to be stored than previously known vaccines.

The vaccines according to the invention are moreover in a form fairly identical with previously known vaccines, particularly, in regard to their viscosity.

Vaccination tests that were made showed (in confirmation of the tests reported above) that the vaccinating power of the vaccines according to the invention is at least as good as that of standard vaccines.

I claim:

1. Smallpox vaccine made up of a ground virus material of the vaccine dispersed in an aqueous solution containing sucrose.

2. Vaccine according to claim 1 wherein the solution also contains dextran.

3. Vaccine according to claim 1 wherein the solution contains from 20 to 40% sucrose.

4. Vaccine according to claim 2 wherein the solution contains from 20 to 40% sucrose and 5% dextran.

5. Vaccine according to claim 1 which contains $10^8$-vaccinal units per ml.

References Cited

UNITED STATES PATENTS

| | | | |
|---|---|---|---|
| 2,787,577 | 4/1957 | Allisbaugh | 424—89 |
| 2,879,202 | 3/1959 | Alston et al. | 424—89 |
| 2,908,614 | 10/1959 | Muggleston et al. | 424—89 |
| 3,135,661 | 6/1964 | Bartell et al. | 424—89 |
| 3,186,908 | 6/1965 | Rightsel et al. | 424—89 |

SHEP K. ROSE, Primary Examiner

U.S. Cl. X.R.

424—176, 361